April 23, 1957
J. A. BARTELINK
2,790,145
ELECTRIC CIRCUIT FOR METERING THE FLOW
OF A LIQUID OR GASEOUS MEDIUM
Filed Nov. 3, 1952
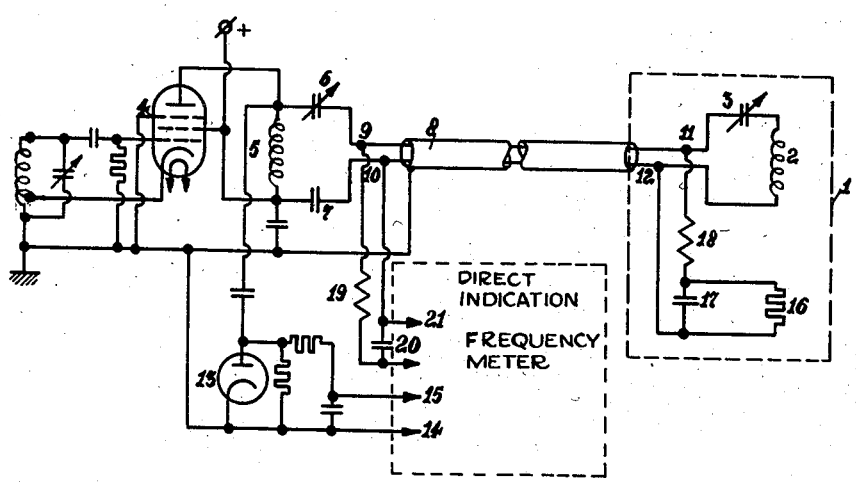
INVENTOR
JAN ANTOON BARTELINK
BY Robert B Pearson
ATTORNEY

United States Patent Office 2,790,145
Patented Apr. 23, 1957

2,790,145

ELECTRIC CIRCUIT FOR METERING THE FLOW OF A LIQUID OR GASEOUS MEDIUM

Jan Antoon Bartelink, Amsterdam, Netherlands, assignor to Nationaal Luchtvaartlaboratorium, Amsterdam, Netherlands, a corporation of the Netherlands Application November 3, 1952, Serial No. 318,474

Claims priority, application Netherlands August 12, 1952

2 Claims. (Cl. 324—78)

This invention relates to an electric circuit suitable for metering the flow of a liquid or gaseous medium and comprises mainly an oscillatory circuit comprising a combination of coils and condensers, one of the coils being fed by a high frequency current of constant frequency and amplitude, a second one having a self-inductance capable of being varied by appropriate means with a frequency proportionate to the flow velocity of the medium through a conduit so as to modulate with said frequency the amplitude of the high frequency circuit current, the modulated high frequency voltage across one of the circuit elements being rectified and subsequently fed into an appropriate frequency meter, which indicates the modulation frequency as a measure of the flow velocity of the medium.

The object of the invention is to provide a simple, economical and effective circuit for metering the flow of fluids.

Another object of the invention is to provide a circuit particularly suitable for use in conjunction with the apparatus disclosed in my co-pending American patent application Serial No. 318,473, filed November 3, 1952, now Patent No. 2,728,893, wherein the aforementioned second coil is mounted on an open ferro-magnetic core and which is further provided with a rotor driven by the liquid flow, said rotor being coupled with an armature to vary the self-inductance of said coil with a frequency proportionate to the velocity of the medium.

A further object is to provide a circuit allowing to compensate automatically and in a simple way the influence of density variations due to variations of temperature.

Further important objects will become apparent from the following detailed description, reference for this purpose being made to the accompanying drawing showing schematically an embodiment of the circuit, suitable to be used in combination with the apparatus disclosed in my above-mentioned American patent application.

In the drawing the part circumscribed by the broken line 1 indicates the measuring element placed in the conduit. Coil 2 is the self-inductance coil mounted on an open core (not shown in drawing) and whose self-inductance is varied by an armature provided on the rotor. Coil 2 together with the adjustable condenser 3 forms part of the tank of the anode circuit of an oscillator tube 4, which may be located anywhere, and forms part of the measuring apparatus which among other things contains a frequency meter.

The oscillator tube 4 is an electron-coupled pentode in accordance with a circuit scheme known per se, so that the frequency generated, which lies e. g. in the 300–500 kc. range, is virtually constant.

The H. F. current supplied by the oscillator has moreover a constant amplitude. The tank circuit consists of a coil 5 with condensers 6, 7 of which condenser 6 is adjustable and 7 is a blocking condenser.

The tank circuit is completed by reactor coil 2 and condenser 3, both of which are located in the reactor unit 1, and the connection between the two parts of said circuit is formed by cable 8, one end of which is connected at points 9 and 10 with the terminals of condensers 6 and 7 which are not connected to coil 5, the other end being connected at 11 and 12 respectively with the free terminal of condenser 3 and the free end of coil 2.

The cable is therefor connected at both ends to points with low impedance. In consequence neither the insulation nor the capacity of the cable itself have to meet high standards, so that one is not confined to close limits as far as the length of the cable is concerned. As devices in accordance with the invention are intended particularly for use in aircraft, the choice of cable may be governed entirely by mechanical requirements.

As condenser 7 is nothing but a blocking condenser, and given the right choice of elements 5, 6, 3, 2, the difference in voltage between the leads of cable 8 is practically nil.

As stated, the oscillator supplies a H. F. current of constant frequency and constant amplitude.

However, as a result of the rotation of the rotor and the armature attached to it (now shown in the drawings), the self-inductance of reactor coil 2 is periodically varied with a frequency which is proportionate to the rotation speed of the rotor.

In consequence the amplitude of the H. F. current in circuit 6, 3, 2, 7, 5 is modulated with the aforementioned frequency, so that a modulated H. F. voltage is created over the elements of this circuit, the modulation frequency being a measure of the speed of the liquid flow.

The modulated H. F. voltage across coil 5 is fed into a detector, e. g. a diode 13, so that a low frequency voltage is available at the output terminals 14, 15, the frequency of which is a measure of the volume of liquid flowing through the metering apparatus per unit of time. The terminals 14, 15 are connected with a frequency meter (not shown in drawing), which indicates the aforementioned quantity.

It is often desirable to determine the weight of the liquid flowing through per unit of time, this being specially the case with airplanes. As the device primarily indicates the volume of liquid, it is in this case necessary to make a correction, the latter being determined mainly by the change in specific gravity of the liquid with the temperature. For this purpose a temperature correction resistance 16 may be introduced into the measuring element, and connected with the temperature correction device of the frequency meter, which application is known by itself.

An advantage of the device in accordance with the invention is that the aforesaid connection can be established over the same cable cores which are included in the anode circuit of oscillator 4, so that only a two-lead cable 8 is required. The connection between the resistance 16, which has a large temperature coefficient and which is in close thermal contact with the liquid, and the frequency meter, is made via a H. F. filter 17, 18 to points 11, 12 of cable 8, passes through this cable to points 9, 10 and then via a second H. F. filter 19, 20 to points 21, 22.

The circuit described is, therefore, very simple and one of its advantages is that the alternating voltage available after detector 13 can easily have an effective value of approximately 40 volts, thus largely exceeding the threshold value of the input voltage required for the frequency meter.

It has further been found that any adjustment (seldom required) may be confined to adjusting that part of the circuit which is located in the accessible frequency meter.

I claim:

1. Electric circuit scheme for metering the flow of a fluid comprising a high frequency electron-coupled oscillator of constant frequency and amplitude, a tank circuit comprising two parts of low impedance being located at a substantial mutual distance and connected in parallel with each other by means of a two-conductor cable of low voltage, each of said parts comprising a coil and a variable condenser in series, means connecting the coil of said first part as an element of the output circuit of said oscillator, means for timing each one of said two parts of the tank circuit substantially to the oscillator frequency, means for modifying the inductance of the coil in said second part at a frequency dependent on the flow velocity of the medium, thereby modulating with that frequency the amplitude of the high frequency current in said tank circuit, a detector connected with said coil of said first part to rectify the modulated high frequency voltage across said coil, and a direct indication frequency meter connected to be fed by said rectifier.

2. Electric circuit scheme according to claim 1, one end of said cable being connected via a high frequency filter with a temperature-sensitive resistor, the other end of said cable being connected via a high frequency filter with a temperature-corrective device of the frequency meter.

References Cited in the file of this patent

UNITED STATES PATENTS

| | | |
|---|---|---|
| 2,274,262 | Wolff | Feb. 24, 1942 |
| 2,374,652 | Cohen | May 1, 1945 |
| 2,580,670 | Gilbert | Jan. 1, 1952 |

FOREIGN PATENTS

| | | |
|---|---|---|
| 580,555 | Great Britain | Sept. 11, 1946 |